(12) United States Patent
Schleelein

(10) Patent No.: US 8,123,515 B2
(45) Date of Patent: Feb. 28, 2012

(54) SYSTEM AND METHOD FOR PRODUCING COMPOSITE MATERIALS WITH VARIABLE SHAPES

(76) Inventor: Robert Frank Schleelein, Ithaca, NY (US)

( * ) Notice: Subject to any disclaimer, the term of this patent is extended or adjusted under 35 U.S.C. 154(b) by 371 days.

(21) Appl. No.: 12/244,110

(22) Filed: Oct. 2, 2008

(65) Prior Publication Data
US 2010/0086631 A1 Apr. 8, 2010

(51) Int. Cl.
B29C 70/34 (2006.01)

(52) U.S. Cl. ..... 425/395; 425/116; 425/155; 425/302.1; 425/330; 425/519; 156/245; 156/433; 156/441; 156/459

(58) Field of Classification Search ..... 425/71, 425/111, 116, 121, 123, 261, 302.1, 336, 425/343, 344, 345, 347, 357, 369, 370, 371, 425/372, 384, 390, 394, 395, 396, 451, 501, 425/505, 519, 520, 521, 112, 289, 155, 156, 425/329, 330, 515; 156/166, 167, 176, 178, 156/179, 180, 181, 242, 243, 245, 292, 275.5, 156/275.7, 273.3, 312, 324, 361, 433, 441, 156/459, 475, 486
See application file for complete search history.

(56) References Cited

U.S. PATENT DOCUMENTS

| | | | | |
|---|---|---|---|---|
| 2,365,804 A * | 12/1944 | Clerke | ..... | 425/357 |
| 2,547,880 A * | 4/1951 | Meyer et al. | ..... | 156/201 |
| 2,568,094 A * | 9/1951 | Smith | ..... | 156/145 |
| 2,642,280 A * | 6/1953 | Fisk | ..... | 226/172 |
| 2,754,956 A * | 7/1956 | Sommer | ..... | 198/626.6 |
| 2,764,193 A * | 9/1956 | Knowles | ..... | 144/254 |
| 2,785,717 A * | 3/1957 | Knowles | ..... | 144/254 |
| 3,064,308 A * | 11/1962 | Caspersen | ..... | 425/396 |
| 3,151,354 A * | 10/1964 | Boggs | ..... | 425/112 |
| 3,189,505 A * | 6/1965 | Jensen et al. | ..... | 156/199 |
| 3,238,565 A * | 3/1966 | Jacobs | ..... | 425/308 |
| 3,477,894 A * | 11/1969 | Pausch et al. | ..... | 156/459 |
| 3,714,317 A * | 1/1973 | Folkes | ..... | 264/231 |
| 3,792,952 A * | 2/1974 | Hamon | ..... | 425/343 |
| 3,841,390 A * | 10/1974 | DiBenedetto et al. | ..... | 164/430 |
| 4,016,026 A * | 4/1977 | Grevich | ..... | 156/555 |
| 4,079,551 A * | 3/1978 | Bando | ..... | 451/260 |
| 4,164,439 A * | 8/1979 | Coonrod | ..... | 156/441 |
| T101,401 I4 * | 1/1982 | Zion | ..... | 156/166 |
| 4,318,762 A * | 3/1982 | Meyer | ..... | 156/180 |
| 4,347,287 A * | 8/1982 | Lewis et al. | ..... | 428/378 |
| 4,417,938 A * | 11/1983 | Sigl | ..... | 156/270 |
| 4,421,712 A * | 12/1983 | Winstead | ..... | 264/551 |
| 4,445,957 A * | 5/1984 | Harvey | ..... | 156/180 |
| 4,498,944 A * | 2/1985 | Krause et al. | ..... | 156/205 |
| 4,518,550 A * | 5/1985 | Miettinen et al. | ..... | 264/46.5 |

(Continued)

Primary Examiner — Joseph Del Sole
Assistant Examiner — Seyed Masoud Malekzadeh

(57) ABSTRACT

This invention provides single-step pultrusion processes for producing fiber reinforced polymer (FRP) articles that may have variable cross sections and/or non-linear shapes. This unique capability results from the use of two sets of dies to form the article. The first is a set of moving dies connected together to form mating continuous loops of moving die links to:
 a) draw the FRP material into the apparatus;
 b) shape the cross section of the FRP material;
 c) cut the FRP material to the appropriate length; and
 d) hold the uncut FRP material in position for the next production cycle. The second set of dies forms a guide path mounted on opposing conveyers. The guide path includes heated die segments to define a curing section that may be non-linear. Cycling the moving die links through the curing section and/or cycling the conveyers provides a straightforward method for automated production of finished pultruded articles with unique shapes.

19 Claims, 14 Drawing Sheets

U.S. PATENT DOCUMENTS

| | | | | |
|---|---|---|---|---|
| 4,624,726 A * | 11/1986 | Harper, Jr. | | 156/323 |
| 4,670,279 A * | 6/1987 | Lesch | | 426/410 |
| 4,816,103 A * | 3/1989 | Ernest | | 156/205 |
| 4,935,279 A * | 6/1990 | Perko et al. | | 428/74 |
| 5,026,447 A * | 6/1991 | O'Connor | | 156/166 |
| 5,066,349 A * | 11/1991 | Perko et al. | | 156/166 |
| 5,073,413 A * | 12/1991 | Koppernaes et al. | | 427/356 |
| 5,098,496 A * | 3/1992 | Breitigam et al. | | 156/180 |
| 5,264,060 A * | 11/1993 | Lambing et al. | | 156/180 |
| 5,324,377 A * | 6/1994 | Davies | | 156/180 |
| 5,421,931 A * | 6/1995 | Carmien | | 156/172 |
| 5,424,388 A * | 6/1995 | Chen et al. | | 528/73 |
| 5,556,496 A * | 9/1996 | Sumerak | | 156/166 |
| 5,585,155 A * | 12/1996 | Heikkila et al. | | 428/36.7 |
| 5,626,700 A * | 5/1997 | Kaiser | | 156/180 |
| 5,716,487 A * | 2/1998 | Sumerak | | 156/359 |
| 5,747,075 A * | 5/1998 | Gauchel et al. | | 425/114 |
| 5,820,804 A * | 10/1998 | Elmaleh | | 264/167 |
| 5,876,553 A * | 3/1999 | Kaiser | | 156/433 |
| 6,037,049 A * | 3/2000 | Tingley | | 428/299.1 |
| 6,048,427 A * | 4/2000 | Gauchel et al. | | 156/180 |
| 6,197,412 B1 * | 3/2001 | Jambois | | 428/297.4 |
| 6,230,776 B1 * | 5/2001 | Choi | | 156/441 |
| 6,395,210 B1 * | 5/2002 | Head et al. | | 264/137 |
| 6,572,719 B2 * | 6/2003 | Fecko et al. | | 156/180 |
| 6,893,524 B2 * | 5/2005 | Green | | 156/180 |
| 7,316,559 B2 * | 1/2008 | Taylor | | 425/371 |
| 2002/0121722 A1 * | 9/2002 | Davies et al. | | 264/129 |
| 2004/0144478 A1 * | 7/2004 | Green | | 156/161 |
| 2005/0287238 A1 * | 12/2005 | Taylor | | 425/371 |

* cited by examiner

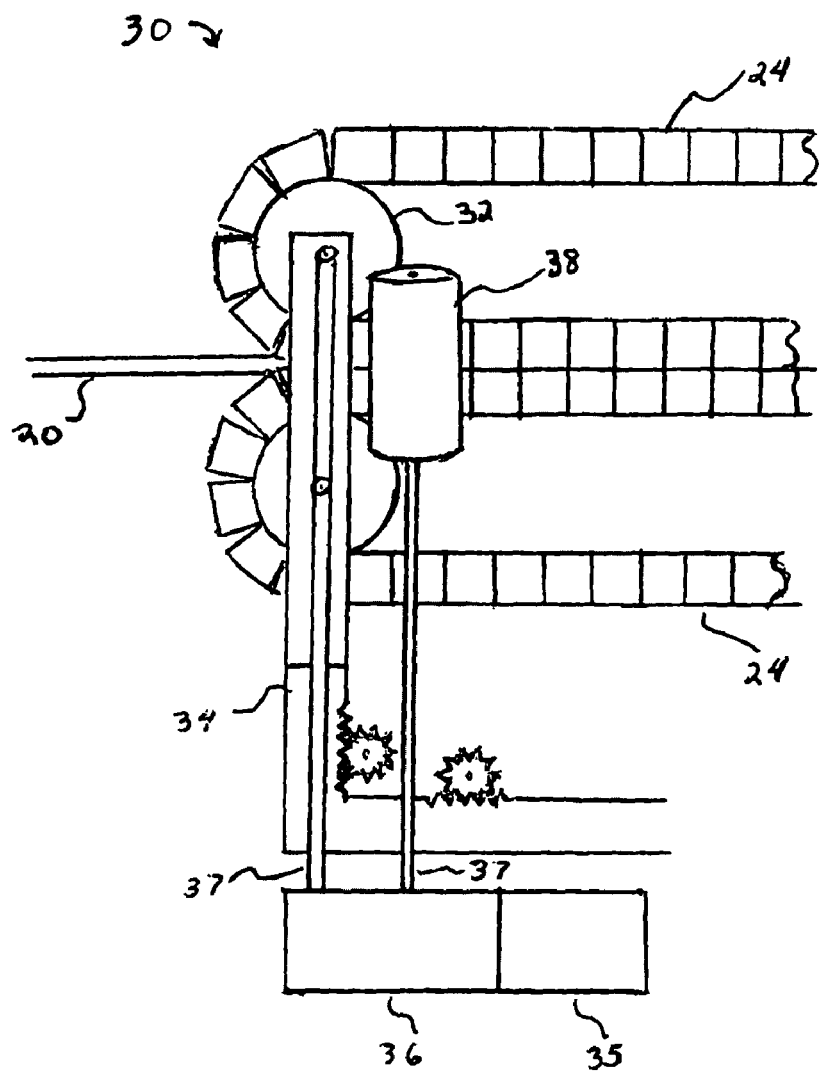

SYSTEM AND METHOD FOR PRODUCING COMPOSITE MATERIALS WITH VARIABLE SHAPES

BACKGROUND

1. Field of Invention

This invention relates to the production of fiber-reinforced thermoset polymer articles that can include variations in cross section with respect to both their transverse and longitudinal axes. More specifically, it relates to a process and apparatus for producing pultruded articles that may, or may not, have variations with respect to the longitudinal axis, or machine direction, the transverse axis, perpendicular to the longitudinal axis, or both axes. In addition, use of the method and apparatus provides the capability of producing articles at a rate that improves upon the throughput of the conventional pultrusion process.

2. Discussion of Prior Art

The pultrusion process has been used extensively to mass produce fiber reinforced polymer (FRP) articles. These articles are rigid composite materials that are straight in the longitudinal direction and have a uniform cross section. The side rails of a ladder, for example, have these characteristics and are produced through a pultrusion process today. In this process, a bundle of fibers is pulled through a resin bath and into a heated die. The shape of the die opening determines the cross section of the pultruded article. The heat of the die cures the resin, solidifying the composite material. When a desired length of the solidified material has been pulled through the die, a cut-off saw cuts the material to form the pultruded article. The standard pultrusion process is capable of producing only articles that are longitudinally straight and have a uniform cross section.

A variation on the pultrusion process, described in U.S. Pat. No. 5,556,496 to Sumerak, describes a two step process wherein a specially controlled pultrusion die, described in U.S. Pat. No. 5,716,478, also to Sumerak, is used. In this process, a length of cured material is pulled through the die, followed by a length of material that is not cured because the temperature of the die has been lowered below the curing temperature of the resin. The uncured material is then reshaped and then cured by pulling it through a die with the profile of the second desired shape. Using this process, variations in the cross-section of the pultruded article can be created to introduce, for example, flanges, off-sets, bosses and the like. The disadvantages of this process are that the thermal cycling of the apparatus reduces throughput and wastes energy. In addition, after the first segment has been cured, an area of partially cured resin will extend into the uncured material, creating the possibility that final cure will not be uniform and the area of transition will be weakened.

U.S. Pat. No. 6,679,695 B2 to Kusy et al. describes a pultrusion apparatus and method for continuous fabrication of fiber-reinforced plastic articles having a non-linear shape. The method is a three step process, comprised of partially curing the material, using a mold to shape the partially cured material, and then completing the curing of the material. Using this method, the cross section of the article cannot be varied. Further, the apparatus is designed to produce only one shape, such as arch wires for orthodontic applications, as described in the preferred embodiment.

Another variation on the pultrusion process, called the, "double die" process was used by Innovative Composites Inc. to produce reinforcing bar (rebar) for reinforcing concrete. The double die process provides a single step process for producing longitudinally straight articles with a varying cross section by the introduction of a moving die that surrounds the resin impregnated fiber and is drawn into the heated static die with it. The moving die has an external cross section that conforms to the shape of the opening of the static die and an internal cross section that varies, but maintains a constant volume that corresponds to the volume of the resin impregnated fiber. The varying shape of the internal cross section of the moving die cavity determines the cross sectional shape of the article. Heat transferred from the static die through the moving die cures the resin. Although the cross section of articles produced by the double die process and the process of U.S. Pat. No. 5,556,496 may vary, the longitudinal axis of these articles must remain straight.

There is a long standing requirement for a process that can produce composite material articles with shapes that can incorporate variations in both the transverse and longitudinal directions. Currently, such articles can be produced only through time consuming manual processes, multiple step procedures, or by connecting component pieces to approximate the desired shape. This increases the cost of the article and/or decreases its strength and reliability.

The present invention provides an apparatus and an efficient method for production of FRP thermoset materials that may include variations in shape in both the transverse and longitudinal directions. In addition, it provides a method for production of FRP materials that improves the quality of pultruded thermoset articles with variations in cross section, and the throughput of the pultrusion process through a single-step, uniform curing process.

Further objects and advantages will be apparent from a consideration of the drawings and ensuing description.

SUMMARY OF THE INVENTION

The present invention provides a system and method for producing thermoset pultruded articles having a variable cross section and/or non-linear shape. In contrast to the prior art that provides methods for producing articles that have either a variable cross section or a non-linear shape; the present invention provides the capability for producing articles with both types of variations. The various embodiments of the invention provide single-step processes for producing fiber reinforced polymer (FRP) materials, in contrast to the multiple-step prior art processes. The basic characteristic of the invention that generates its unique capability is that it uses two sets of dies to shape the pultruded article. The first is a set of moving dies to enclose the FRP material and define its cross section. The second set of dies forms an enclosed guide path to form the longitudinal shape of the article.

The moving dies are connected together to form mating continuous loops of moving die links. Various embodiments of the apparatus use these continuous loops of moving die links to:

a) draw the FRP material into the apparatus;
b) shape the cross section of the FRP material between the mating moving die links;
c) cut the FRP material to the appropriate length; and
d) hold the uncut FRP material in position for the next production cycle.

To perform the above functions, three types of moving die links are used. The first type is designated as a "shaping" link. Shaping links surround the FRP material, draw it into the apparatus and form it to the shape of the cavity between the links. The second type is a "shearing" link. A shearing link typically has the characteristics of the shaping link, but also has the capability to shear the uncured FRP material. The third type of link is a "spacer" link. Spacer links separate one manufactured article from another. Depending on the complexity of the pultruded article, a plurality of spacer links can be used to complete the continuous loop of links. The three types of links are connected in the appropriate sequence to shape the FRP material into the shape of the article and separate the individual articles from each other.

As stated above, the loops of moving die links are drawn into a guide path that is formed by another set of dies. This second set of dies includes heated die segments to enclose the moving die links and cure the FRP material. These die segments are mounted on opposing conveyers so that they define a "curing section" of the guide path that may be non-linear. Cycling the moving die links through the curing section and/or cycling the conveyers on which the curing section is mounted provides a straightforward method for automated production of finished pultruded articles with unique shapes.

Variations in the process of the invention can be used to produce articles with different characteristics. In one embodiment, for producing articles with variations in both the transverse and longitudinal directions, the process includes the steps of cycling the moving die links so that an appropriate length of FRP material is enclosed by shaping links and drawn into the apparatus. Following the length of shaping links is a shearing link that severs the FRP material. Following the shearing link is a length of spacer links that pass over the FRP material remaining at the shearing station, without drawing that material into the apparatus. As the loops of moving die links advance, the sequence of mating shaping links in the loops draws the severed FRP material into the preconfigured guide path that has been established in the space between two opposing conveyers. When the moving die links are in the curing section of the guide path, the motion of the links is stopped and curing is initiated. When curing is complete, the conveyers are cycled, ejecting the cured article and advancing the loops of moving die links into position for the next cycle.

The apparatus and process may be adapted to produce conventional, longitudinally straight articles. To produce this type of article, the guide path is configured to be straight and the moving die links are cycled through the guide path at a rate that causes the FRP material to reach its curing temperature before the article exits the apparatus. In this case, the conveyers are held stationary throughout the process. Even though articles produced by this process will be longitudinally straight, they may include variations in cross section, created by changes in the cavities defined by mating moving die links.

DESCRIPTION OF DRAWINGS

FIG. 2 is a side view illustration of the portion of the apparatus for drawing in resin impregnated fiber and cutting it to a desired length.

DETAILED DESCRIPTION OF THE INVENTION

Figure 1:
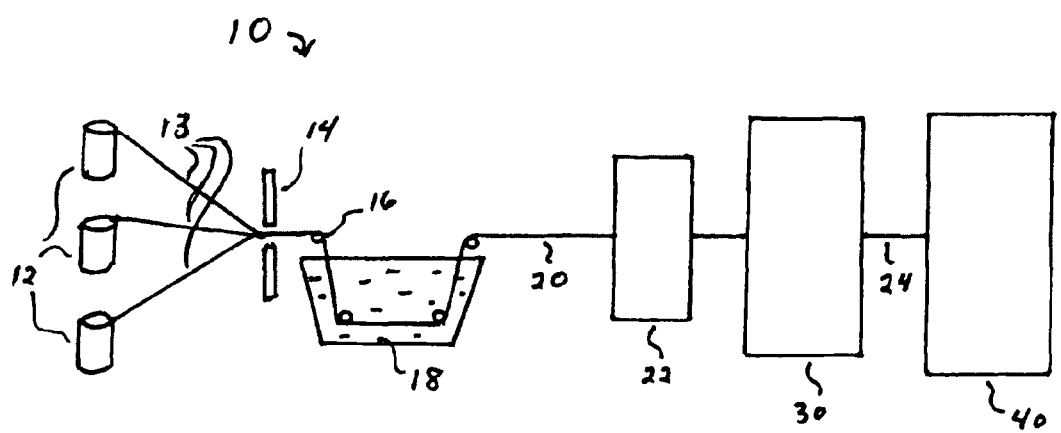
FIG. 1 is a schematic illustration of an apparatus for carrying out the method of the present invention.

The present invention provides the capability for producing FRP materials that can have variations in shape that cannot be produced by the prior art processes. This capability is the result of the following processes:
  cutting the FRP material before curing;
  forming the FRP material into the shape of the finished article;
  curing the shaped FRP material; and
  ejecting the finished article from the apparatus.

In addition, the invention can produce articles that can be produced by the prior art processes, through straightforward modifications of the apparatus and/or method of the invention. In such cases, the throughput and/or quality of the article will be improved.

The pultrusion apparatus of the invention is a departure from the conventional pultrusion apparatus in that it uses a unique system of dies within dies. A sequence of inner moving dies provides the capability to vary the cross section of the pultruded article. A sequence of outer heated dies defines a guide path that provides the capability to vary the longitudinal shape of the pultruded article and cure it in place. The polymer is cured by heat transfer from the outer dies through the inner dies. The outer die guide path is set up on conveyers, which provide the capability for a fully cured article of complex shape to be ejected from the apparatus. This is in contrast to the conventional apparatus, which uses pullers to draw the cured material out of a die, and does not allow for longitudinal variations in the material. The inventive apparatus uses dies of different types linked together to shape, cut and hold in place the FRP material. It separates articles by the use of a type of die designed to shear the reinforcing fibers prior to the curing process. This is in contrast to the conventional method of sawing the pultruded material after it has been cured. The relative sizes of the components of the apparatus are determined by the article to be pultruded. Specifically, the inner dies must be small enough to allow them to travel through the curing path without jamming. The outer dies must be strong enough to withstand the pressures generated during the curing process. The conveyers must be large enough to contain the pultruded article; or, alternatively, large enough to contain a pattern to be replicated to form the pultruded article. Once the apparatus has been set up, an automated, high throughput process that is capable of producing articles with variations in shape is established.

Specialized moving die links provide capabilities for the creation of features not typically found in pultruded articles. Some representative examples are:

grommet or bolt holes created by tubular cutters in mating moving die links;

tabs or bosses created by cutting and reshaping the FRP material within mating moving die links;

handle grips created by multiple shallow cutters within mating moving die links;

loops or "U" shapes for joining two articles by the use of moving die links with internal dividers for separating the FRP material.

An embodiment of the invention will now be described with respect to a pultrusion apparatus for pultruding a sheet or strip having a generally rectangular cross-section. It will be apparent, however, that generally any desired cross sectional shape can be produced, including tubes and rods having square, circular, rectangular, trapezoidal, X-shaped, T-shaped, J-shaped, I-shaped and other regular or irregular cross-sectional shapes or profiles. In addition, the invention provides a means for pultruding articles that are not necessarily straight along the longitudinal axis, or the machine direction. The following description will assume that bends will be incorporated into the shape of the article. It will also be apparent, however, that the apparatus and process are versatile enough to produce a wide variety of article shapes after straightforward customization of the apparatus.

Referring to FIG. 1, an exemplary pultrusion apparatus is generally designated by the numeral 10. The apparatus includes a plurality of creels or spools 12 from which reinforcing fibers 13 are drawn through a guide 14 and around redirect bars 16 through a resin bath 18 that contains a thermosetting resin. The fibers 20 emerging from the resin bath 18 will be saturated with resin. Alternatively, preimpregnated fibers can be used or other known resin impregnation techniques, such as spraying, dipping, roll coating, brushing, or injection could be used. The resin impregnated fibers 20 are then pulled into a forming guide 22 that arranges the fibers in a configuration that is readily received by the next stage, which is a means for gripping, shaping, pulling and cutting, identified as a fiber uptake/shearing station 30. After passing through the fiber uptake/shearing station the resin impregnated fiber is drawn into a means for curing the resin and recycling the links to their starting positions, identified as a curing/recycling station 40 in FIG. 1.

An example fiber/uptake station 30 is shown in greater detail in FIG. 2. The resin impregnated fiber 20 is gripped by moving die links 24 which are extended over drive wheels 32 and enclose the fiber 20 from above and below at the point where the upper and lower die links 24 meet. This illustration shows two sets of die links 24 connected in continuous loops. Alternative orientations and shapes and/or use of more than two loops could be used. The drive wheels 32 are mounted on a frame 34 that provides means for adjustment of the positions of the wheels 32 both along the axis of the apparatus and perpendicular to it. In FIG. 2, the horizontal and vertical adjustments of the drive wheels 32 are made by rack and pinion gears which move the frame 34 over an "L" shaped support. Adjustment along the axis of the apparatus will establish proper tensioning of the moving die links 24. Adjustments of the heights of the wheels 32 (perpendicular to the axis of the apparatus) facilitate the initial set up of the apparatus by enabling the manual insertion of the fiber 20 into the space between the moving die links 24. Independent height adjustment of the wheels 32 also enables the change-over of the apparatus for use with different sized moving die links 24.

The function of the moving die links 24 is to enclose the fiber 20, move it through the apparatus and impart to it the cross sectional shape of the article. In FIG. 2, the links 24 are shown as two opposing rectangles, each with an open side for gripping and shaping the fiber 20. Virtually any external shape could be chosen for the links, so long as it conforms to the internal shape of guide path links in the next stage. The guide path links are explained below. Selection of a standard external shape and size for the moving die links 20 will increase the versatility of the apparatus, facilitating the change-over for production of different articles. More than two chains of moving die links could be used to enclose the fiber. However, for simplicity two chains of links will be used in this illustration. As stated above, one function of the moving die links 24 is to impart the cross sectional shape of the article to the fibers 20. As the opposing links come together, they form an interior cavity that will be filled with the fiber. The cross sectional shape of the interior cavity can vary, so long as the volume remains constant and matches the volume of the fiber 20. This capability can be used to produce a flange on a pultruded article, for example, by changing the shape of the cavity between opposing die links from the cross section of the article to the cross section of the flange.

FIG. 2 also gives an illustration of the elements used to pull the resin impregnated fiber 20 into the apparatus and cut it to the appropriate length. An electric motor 35 is connected through transmission 36 to a drive shaft 37 that will turn the drive wheels 32. Electric motor 35 is also connected through transmission 36 to additional drive shafts 37 that will turn shearing rollers 38. The function and operation of the shearing rollers is explained below.

Figure 3A:
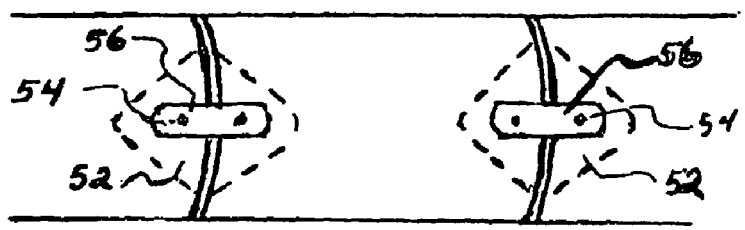
FIG. 3a is top view illustration of the connection between moving die links.
Figure 3B:
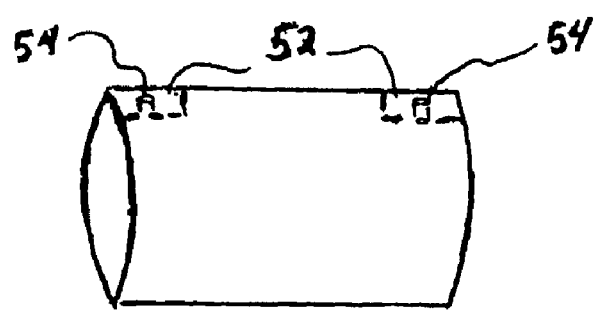
FIG. 3b is a side view illustration of the connection between moving die links.
Figure 3C:
FIG. 3c is a top view illustration of the connector plate for connecting moving die links.

The moving die links 24 are connected in a continuous loop chain in such a way as to allow movement of each link about the points of connection with the preceding and succeeding links. FIG. 3a gives a top view illustration of one of many possible methods for connecting the links. The joints between the links are curved to minimize gaps between the links when the chain of links traces a curve. The front end of each link body is shown to be generally concave and the back end of each link body is shown to be generally convex so that the links will maintain contact even when they follow a path that includes bends. Each end of each link has a recessed area 52, generally triangular in shape; with a tapered pin 54 projecting up from the recess, shown in FIG. 3b. A plate 56 with holes at each end, shown in FIG. 3c, is placed over each of the pins, connecting the links in a way that is similar to the connections of the links in a bicycle chain. The recess is generally triangular in shape so as to allow the links to pivot around the pins 54. The size of the links chosen for an article is determined by the cross sectional volume of the article and the size and tightness of the bends included in its design.

Figure 3D:
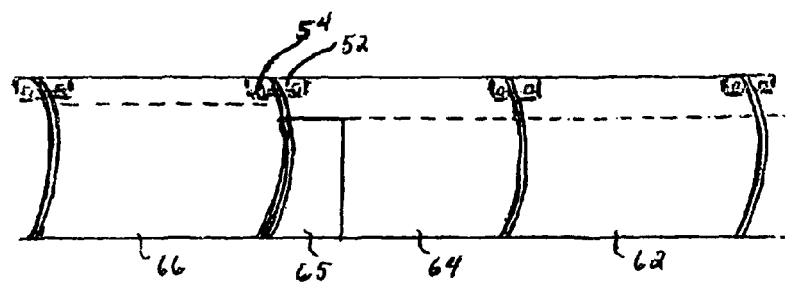
FIG. 3d is a side view illustration of the different types of moving die links.
Figure 3E:
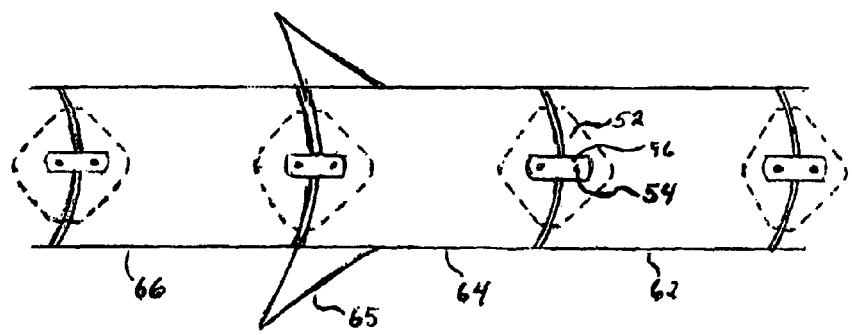
FIG. 3e is a top view illustration of the different types of moving die links.

Three types of links, illustrated in FIGS. 3d and 3e, are used. The first is a shaping link 62, described above. Opposing pairs of shaping links 62 create an internal cavity that matches the cross sectional volume and shape of the article.

Shaping links 62 grip the fibers 20 and draw them into the apparatus. The second type of link is a shearing link 64. It will have the same characteristics as a shaping link 62, and also have features designed for cutting the fibers to the appropriate length for the article piece. One possible design for a shearing link 64 is to attach "wings" 65 projecting from the sides and then turned sharply toward the center of the link. The wing mechanism will have knife edges facing into the center of the link. When the shearing link passes through a shearing station, the shearing station rollers 38 will flatten the wings of the shearing link 64 against the sides of the link and the knife edges will be driven through the interior cavity, severing the enclosed fibers. Alternative designs for shearing links are possible. For example, optical or mechanical sensors could be set up to recognize shearing links that enter the shearing station. When a sensor indicates that a shearing link is at the shearing station, computer control would stop the advance of the moving die links and turn on a separate electric motor to drive a knife blade mounted at the shearing station through mating slots in the upper and lower shearing links 64. In some applications, partial shearing of the fibers may be desired. For those applications, specialized shearing links could be designed to cut and/or remove some of the fiber. Examples include the use of tubular cutters to create grommet holes, cutters for making shallow cuts to create handle grips, and cutters for making slanted cuts in mating surfaces to be joined together after curing. If the article design includes a hole, such as for receiving a grommet or bolt, the mating links can be configured with mating tubular cutters with open centers. The material in the centers will be cured during the curing process and expelled after the moving die links are cycled out of the curing station. The third type of link is a spacer link 66. Spacer links 66 differ from shaping links 62 in that opposing pairs of spacer links create an internal cavity that is larger than the cross sectional volume of the fibers 20. Spacer links will not grip the fibers 20 or draw them into the apparatus, but will hold the fibers 20 in position in the space between the drive wheels 32 as long as the die link chains contain only spacer links. When the next pair of shaping links in the chain cycle into position between the drive wheels 32, they will grip the severed fibers 20 and draw them into the apparatus. The function of spacer links is to separate one article piece from another. Because spacer links 66 will not be involved in producing an article piece, their interior walls may be straight, as opposed to conforming to the article cross section; and they may be made of heat insulating, rather than heat conducting, material. FIG. 3*d* gives a side view illustration of a succession of the three types of links. A shaping link 62 is connected to a shearing link 64, which is connected to a spacer link 66. This sequence of links is essentially the sequence that will be used to form the end of a typical article piece.

Figure 4A:
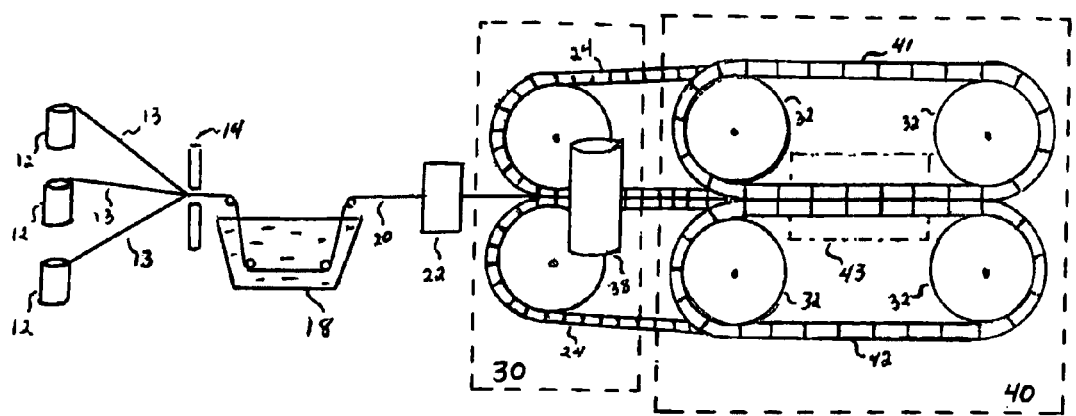
FIG. 4a is a schematic illustration of the apparatus, showing the relationship between the curing system and the fiber uptake system.
Figure 4B:
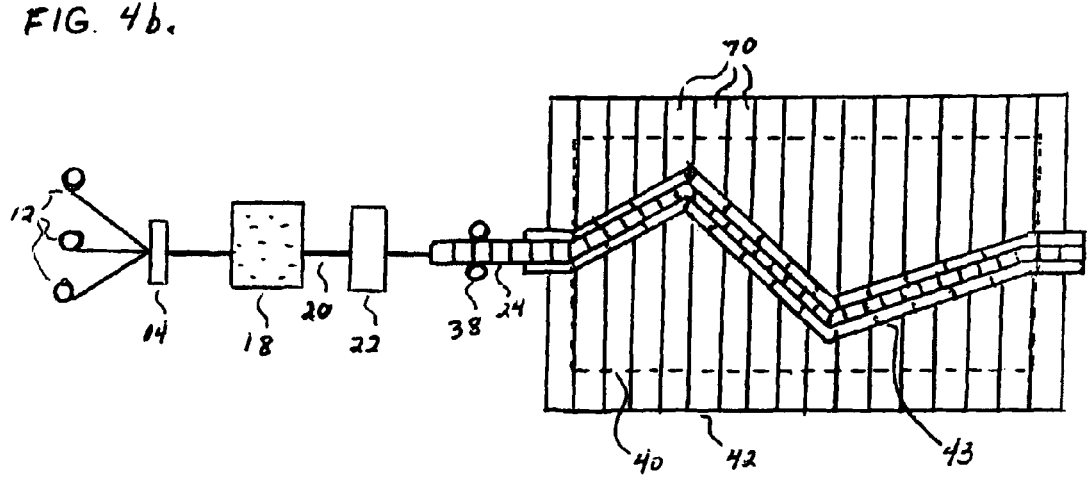
FIG. 4b is a top view illustration of the lower conveyer portion of the apparatus, showing the guide path and its relationship to the fiber uptake system.
Figure 4C:
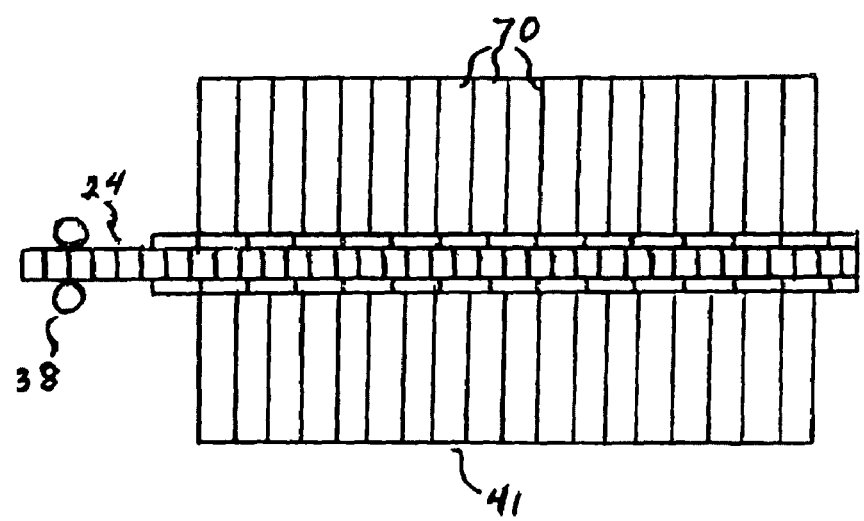
FIG. 4c is a top view illustration of the upper conveyer portion of the apparatus, showing the return path for moving die links.
Figure 5A:
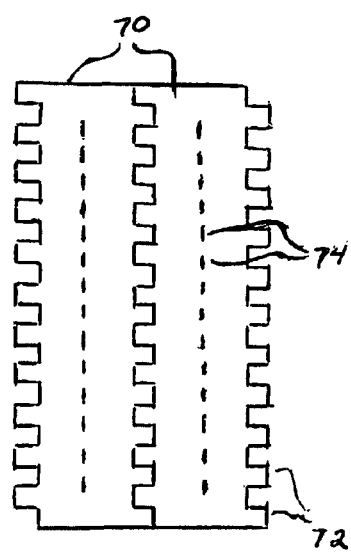
FIG. 5a is a top view illustration of the slats that form the surface of the conveyers.
Figure 5B:
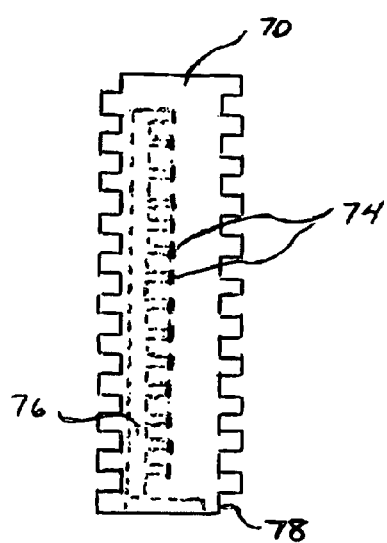
FIG. 5b is a bottom view illustration of one of the slats that forms part of the surface of the conveyers.
Figure 5C:
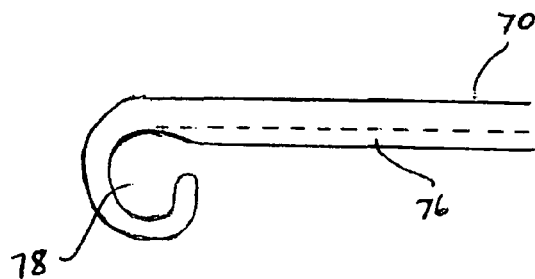
FIG. 5c is a side view illustration of the edge of one of the slats that forms part of the surface of the conveyers.

FIG. 4*a* provides a simplified side view illustration of the apparatus, showing the general concept of the curing/recycling station of FIG. 1 and its relationship to the fiber uptake/shearing station. A guide path 43 is established in the space between upper and lower conveyers, 41 and 42 respectively. The guide path encloses a space that will be followed by the moving die links 24 and will be the site for curing the resin. A simplified top view of the lower conveyer 42 is given in FIG. 4*b*. The conveyers are composed of slats 70 hinged together and stretched over a frame with drive wheels at each end. The surface area of the conveyers is large enough to contain the article, including all variations along the axis perpendicular to the longitudinal axis of the apparatus. The frame is expandable in the longitudinal direction to allow it to support a range of conveyer lengths. FIG. 4*c* provides a top view illustration of the upper conveyer 41, showing a straight return path to the fiber uptake station 30 for the moving die links 24 that have passed through the guide path 43. For some articles, it will be possible to increase throughput by setting up a return path in the same pattern as the guide path, so that a half cycle of the conveyers, rather than a full cycle, will reestablish the guide path in its operating position and the next production cycle can begin. FIG. 5*a* provides a top view illustration of the slats 70 on the conveyer surface. The slats 70 are made of rigid material, with mating hinges 72 placed on the edges in such a way that the slats can be connected or disconnected by a slight movement of one with respect to the other. Each slat 70 has a plurality of mounting holes or slots 74 cut through it. As shown in FIG. 5*b*, the under side of each slat 70 has a grooved channel 76 running from the outside (not hinged) edge to each of the mounting holes 74. The channel 76 provides a path for electric cables from the power source along the slats to the guides to be mounted on the slats, as explained below. Similarly, the channels 76 provide a path for connecting wires from sensors, such as thermocouples, to the computer control. As shown in FIG. 5*c*, the outside edge of each slat 70 is curled under to provide a channel 78 from one slat to another, for routing electric cables and sensor wires.

Figure 6A:
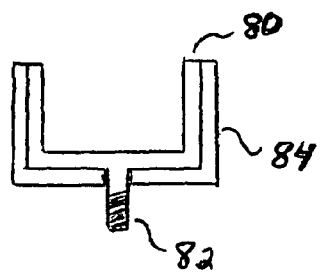
FIG. 6a is an end view illustration of a channel guide segment and heater plate.
Figure 6B:
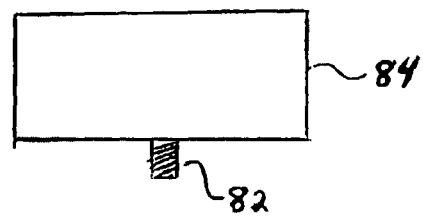
FIG. 6b is a side view illustration of a channel guide segment and heater plate.
Figure 7:
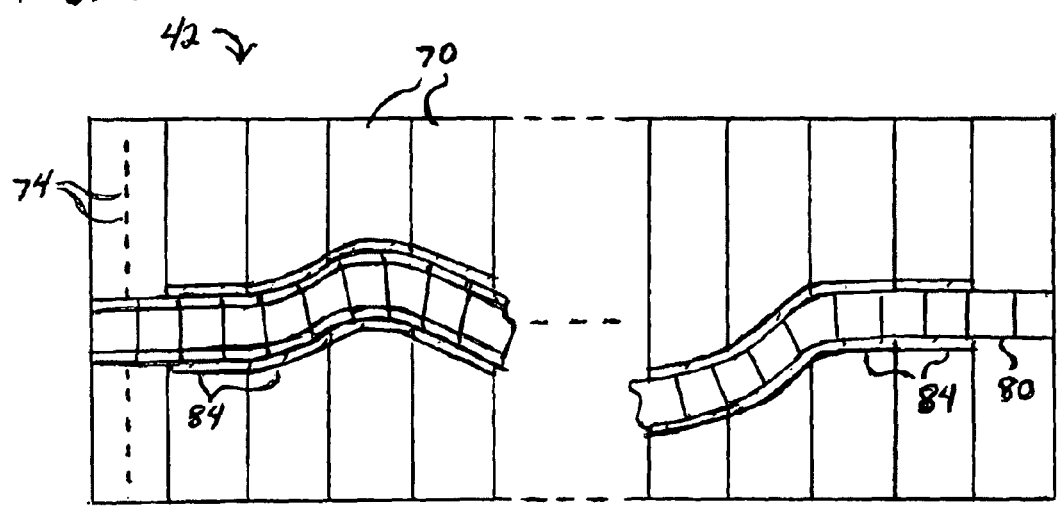
FIG. 7 is a top view illustration of the lower conveyer, showing the curing section of the guide path, with heater plates attached to the guide path segments.
Figure 8:
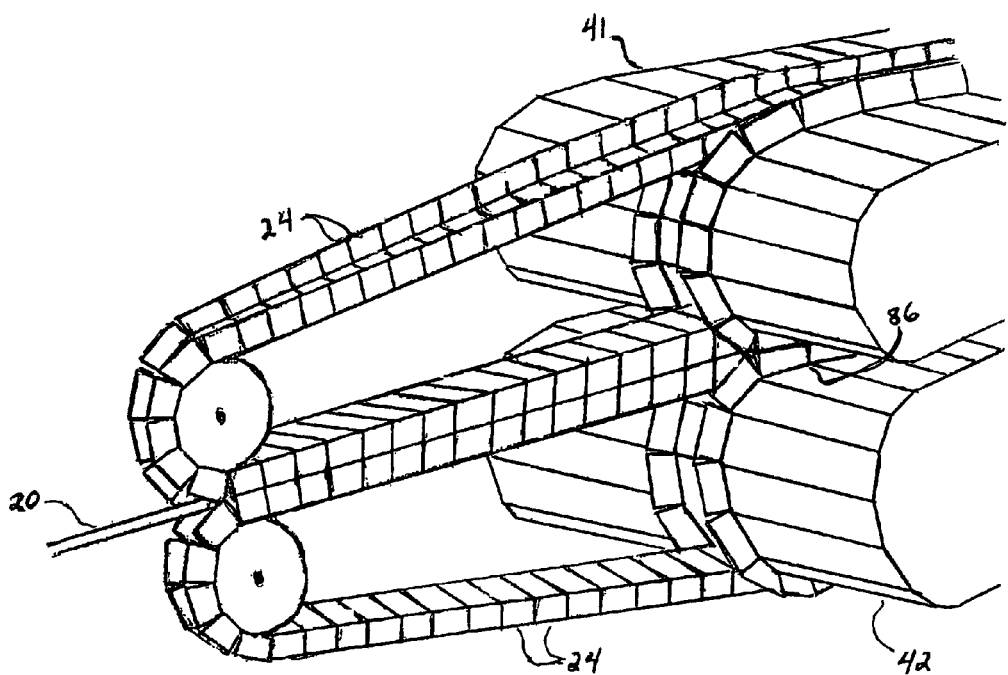
FIG. 8 is an illustration of moving die links enclosing resin impregnated fibers and drawing them into the channel guide between the upper and lower conveyers.

Attached to the mounting holes 74 in the slats 70 is a plurality of channel guides 80, illustrated in FIGS. 6*a* and 6*b*. FIG. 6*a* provides an end view illustration, showing the channel guide 80 as an open ended rectangle. Attached to side opposite to the open end of each channel guide 80 is a mounting bolt 82. Attached to the outside surfaces of selected channel guides 80 are heater plates 84. FIG. 6*b* provides a side view illustration. The width of the channel guides 80 is equal to the width of the slats 70, so that edges of the channel guides 80 meet and form a continuous path across the surface of the conveyer. Mirror image paths of channel guides 80 are set up on the mating surfaces of the upper and lower conveyers 41 and 42. Channel guides 80 with curved sides can be used where a bend in the article is desired, as in the case of certain shovel handles. FIG. 7 gives a simplified top view illustration of the layout of the channel guides for the lower conveyer 42. Heater plates 84 are attached only to the channel guides 80 that will be involved in the curing process. Channel guides 80 without heater plates are mounted on all slats 70 not used in the curing process, so as to form a continuous path across the "back" side of the conveyer to connect to the "front" of the sequence of channel guides. The interior dimensions of the channel guides 80 match the exterior dimensions of the moving die links 24. When the upper and lower channel guides 80 are in position for curing, they form a channel guide path whose interior cross section dimensions match the exterior cross section dimensions of mating moving die links 24. The shape of the channel guide path 86 is the shape of the article. FIG. 8 illustrates the uptake of the fiber 20 by the moving die links 24 and the moving die links 24 being drawn into the channel guide path 86, between the upper conveyer 41 and the lower conveyer 42.

Figure 9:
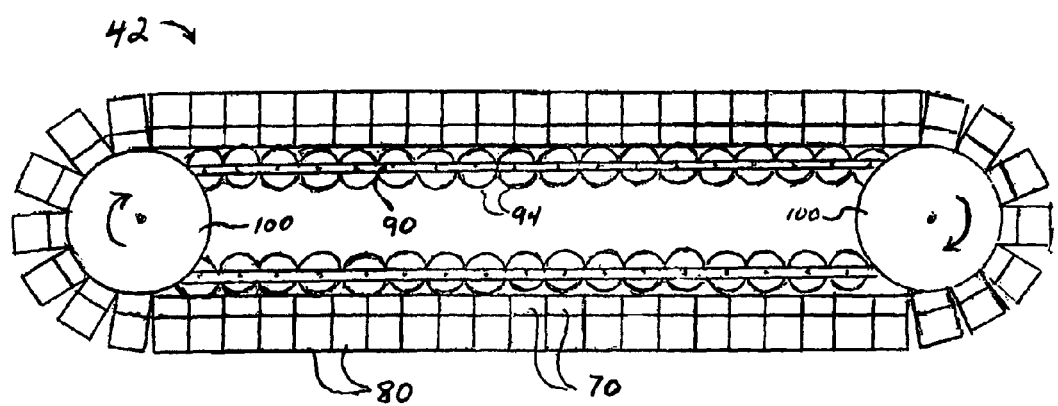
FIG. 9 is a side view illustration of the lower conveyer, showing the frame and rollers for supporting the guide path segments.
Figure 10:
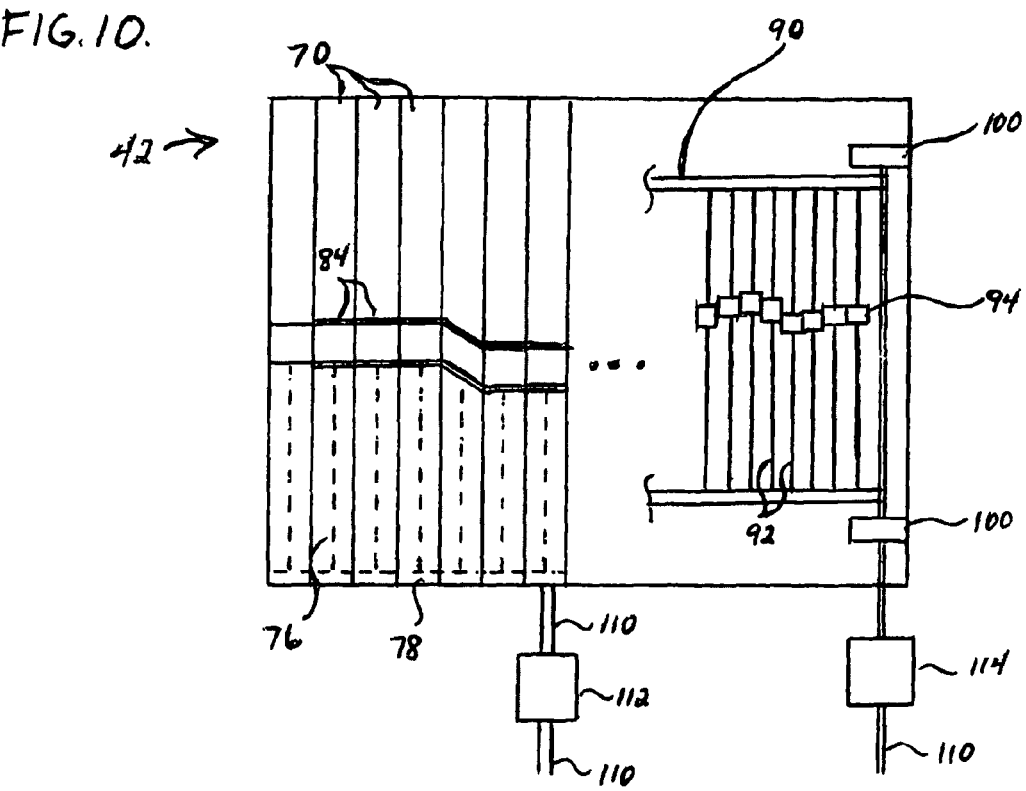
FIG. 10 is a cut away top view illustration of the lower conveyer, showing the routing of electric cables and sensor wires on the left side, and, on the right side, the supporting frame and rollers, and the conveyer drive wheels and motor.

FIG. 9 gives a side view of the extendable frame 90 that provides support for the upper and lower conveyers, 41 and 42. Drive wheels 100 for cycling the conveyers are mounted at the ends of the frame. As shown in FIG. 10, the frame 90 has ribs 92 extending in the transverse direction, parallel to the slats 70. Rollers 94 are mounted on the ribs, on fittings that allow the rollers to be repositioned at any point along the rib. In the set up of the apparatus, the rollers 94 are positioned directly under the guide path 86 to provide maximum support and resist the pressure on the guide path 86 during the curing process. Additional rollers may be positioned along the ribs to provide additional support for the slats mounted on the conveyers. FIG. 10 also gives a top view, cut away diagram of the frame 90, with the support rollers 94 positioned on the frame ribs 92. In addition, FIG. 10 gives an illustration of the system for delivering electrical power to the system, as explained below.

The preferred method for heating the moving die links 24 is to use electric power to raise the temperature of heater plates attached to the guide path segments 86. It would be possible, however, to use other methods. For example, a hot oil system could be used by substituting tubes and hoses for the electric cables in the following description. Alternatively, electromagnetic radiation could be used to cure the polymer by the installation of radiation emitters in the spaces enclosed by each conveyer. As illustrated in FIG. 10, electrical heating of the guide path is accomplished by a plurality of cables 110 configured in a bundle, extending from a power source to a coupling 112 to an entry point in each of the conveyers 41 and 42. The coupling 112 includes an electrical connector that maintains electrical contact with each of the wires in the bundle when the bundle is rotated. The coupling 112 also includes a spring mounted reel to allow the wires to extend and retract when the conveyers are cycled. The cables 110 are attached to the grooves 76 in the undersides of the slats 70. Each cable 110 connects to a heater plate 84 through a connector extending through the mounting hole 74 in each slat 70. Because the cables are routed in the recesses provided by the grooves 76, they are protected from wear when the conveyers 40 are cycled. In a similar manner, signal wires are routed and connected to thermocouples at each channel guide 80. Straightforward electrical connections are made via electric cables 110 to the various electric motors 114 for driving the moving die links 24 and the conveyers 40.

The innovative aspects of the invention may also be combined with conventional pultrusion technology. For example, the system of moving die links may be used to enclose resin impregnated fiber and impart a special cross-sectional shape to the article, which will be longitudinally straight. The moving die links enclosing the fiber may be pulled into a conventional heated static die. At the exit of the heated static die, the moving die links may then be cycled back to the die entrance to enclose and shape additional fiber, while the cured material is pulled by a conventional puller. Either shearing links or a conventional cut off saw may be used to separate the pultruded articles. The advantages of this process are that the cross-section of the pultruded article may vary, and the wear on the static die will be reduced. Another example of the use of an aspect of the invention with conventional pultrusion technology is the use of the heated guide path dies without the use of moving die links. In this case, the resin impregnated fiber is pulled by the cycling of the conveyers and the pultruded article may have longitudinal variations. A conventional cut off saw would be used to separate the articles being produced. In this example embodiment, the cross-section of the article could include variations.

Operation of Invention

Figure 11:
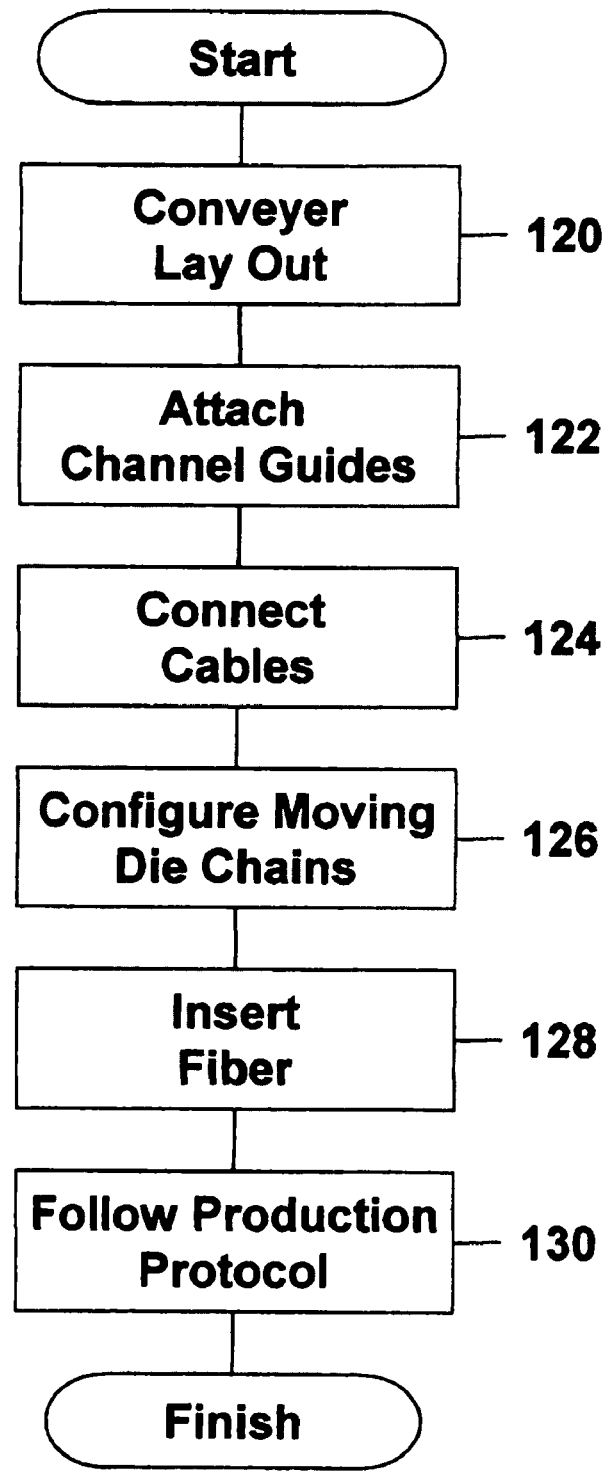
FIG. 11 is a flow chart listing the sequence of steps in a typical set up and operation of the invention.

A generalized flow diagram of the operation of the invention is provided in FIG. 11. Referring to FIG. 11, Conveyer Lay Out 120 is a preliminary step for setting up the apparatus, taking into account the characteristics of the item to be produced. The length and width of the conveyers 40 are selected to enclose the shape of the article, including bends. Channel guides are selected to trace guide path in the shape of the article across the conveyers. Adjustments are made to the length and width of the support frame 90 to provide support along the guide path.

The next step, Attach Channel Guides 122 refers to the process of attaching the channel guides to the conveyers along the path conforming to the product shape by inserting the bolt ends into the mounting holes 74 in the conveyer slats 70.

Connect Cables 124 refers to the routing the power cables to the heater plates at each channel guide using the grooves in the under sides of the conveyer slats. Similarly, the sensor wires are routed from the computer control to the heater plates.

In FIG. 11, Configure Moving Die Chains 126 refers to the set up of the moving die links that will enclose the resin impregnated fiber 20. The moving die links must be small enough to move through the guide path without jamming. The continuous loop of moving die links is composed of a length of shaping links 62 that define the length of the article. Terminating the length of shaping links is a shearing link 64. A length of spacer links 66 connects the shearing link back to the first shaping link, closing the loop. Before the loop is closed, the moving die links are routed through the guide paths of the upper and lower conveyers. The loops of moving die links are then closed so that they travel from the fiber uptake station through the upper and lower guide paths and along the return paths to the fiber uptake station.

Insert Fiber 128 refers to the routing of the fiber from the creels through the fiber guide and resin bath to the fiber uptake station. Once the resin impregnated fiber 20 is enclosed by the moving die links in the fiber uptake station, the moving die links are cycled until the first shaping link encloses and grasps the resin impregnated fibers 20. The heater plates 84 in the guide path 86 are then turned on. When the guide path has reached the curing temperature of the resin, the manufacturing operation can begin.

Follow Production Protocol 130 refers to the process for producing the item to be manufactured. The specific protocols used in production are determined by the shape of the item being produced. The examples below illustrate some of the protocols used in the operation of the apparatus and also illustrate the versatility of the invention.

EXAMPLE 1

Longitudinally Straight Article with Variations in the Transverse Direction

Some examples of articles in this category are straight concrete reinforcing bars and straight tool handles. In the case of rebar, the transverse cross section will vary to enable the mechanical bonding of the rebar with the concrete. In the case of a tool handle, the transverse cross section will vary to provide a hand grip and a fitting for the attachment of a tool head. For this type of article, the guide path is straight across the conveyers and the variations in the transverse cross sectional shape are generated by variations in the interior profile of the moving die links. The moving die links cycle through the curing section of the guide path at the appropriate rate to insure that the curing temperature of the polymer is reached before the links exit the curing section. Shearing links are positioned in the chain of moving die links so that the fibers are cut to the desired length of the article. For a very long article, the alternative shearing station described above is used. The chain of moving die links is configured so that the article length is a whole number multiple of the length of the chain of moving die links. Under computer control, each transit of the shearing link through the shearing station is counted until the correct multiple has been counted. At that point, the cycling of the moving die links is stopped and the shearing operation is initiated. After the shearing operation is complete, the moving die links continue the cycle through the curing section of the guide path and the completed article is ejected from the apparatus when the severed end reaches the exit point.

EXAMPLE 2

Articles having Longitudinal Variations

Articles in this category include snow shovel handles that incorporate bends in the design. In this case, the guide path is set up in the shape of the article. The chain of moving die links is set up to include a shearing link at the appropriate position to cut the fibers at the article length. The fibers to be cured are separated from the fibers extending back to the creels by the action of the shearing link as it passes through the shearing station. The moving die links enclosing the fibers to be cured are then rapidly cycled into the curing section of the guide path. When the shaping links are positioned in the curing section of the guide path, the motion of the moving die links is stopped for the appropriate time to allow the resin to cure. At the shearing station, the resin impregnated fiber that was severed is held in the fiber uptake station by a succession of spacer links. After the curing time has elapsed, the solidified article is housed in the curing section of the guide path. The upper and lower conveyers are then cycled, advancing the guide path to the exit point and advancing the loops of moving die links. As the conveyers cycle past the exit point, the guide path opens, ejecting the article. When the conveyers complete one cycle, the curing section of the guide path is again in its original position. At the same time, the moving die links have advanced through the fiber uptake station and the shaping links in the loop are ready to draw another length of fiber into the curing section.

EXAMPLE 3

Articles having Repetitive Longitudinal Variations

For articles with periodic variations in shape along the longitudinal axis, the guide path is set up in the shape that is to be replicated. The length of the conveyers is adjusted so that they are covered by a whole number of segments of a pattern that is to be replicated. As in example 2 above, the moving die links draw the resin impregnated fiber into the curing section of the guide path. After the first segment of the article has been cured, the drive wheels for the conveyers are engaged, moving the cured segment to the exit point and simultaneously drawing in moving die links with uncured resin impregnated fiber. The rate of the cycling of the conveyers is set so that the resin is cured before the article is ejected from the apparatus. As in example 2 above, the shearing operation is activated at the appropriate time.

EXAMPLE 4

Articles having Non-Planar, Non-Linear Shapes

Figure 12:
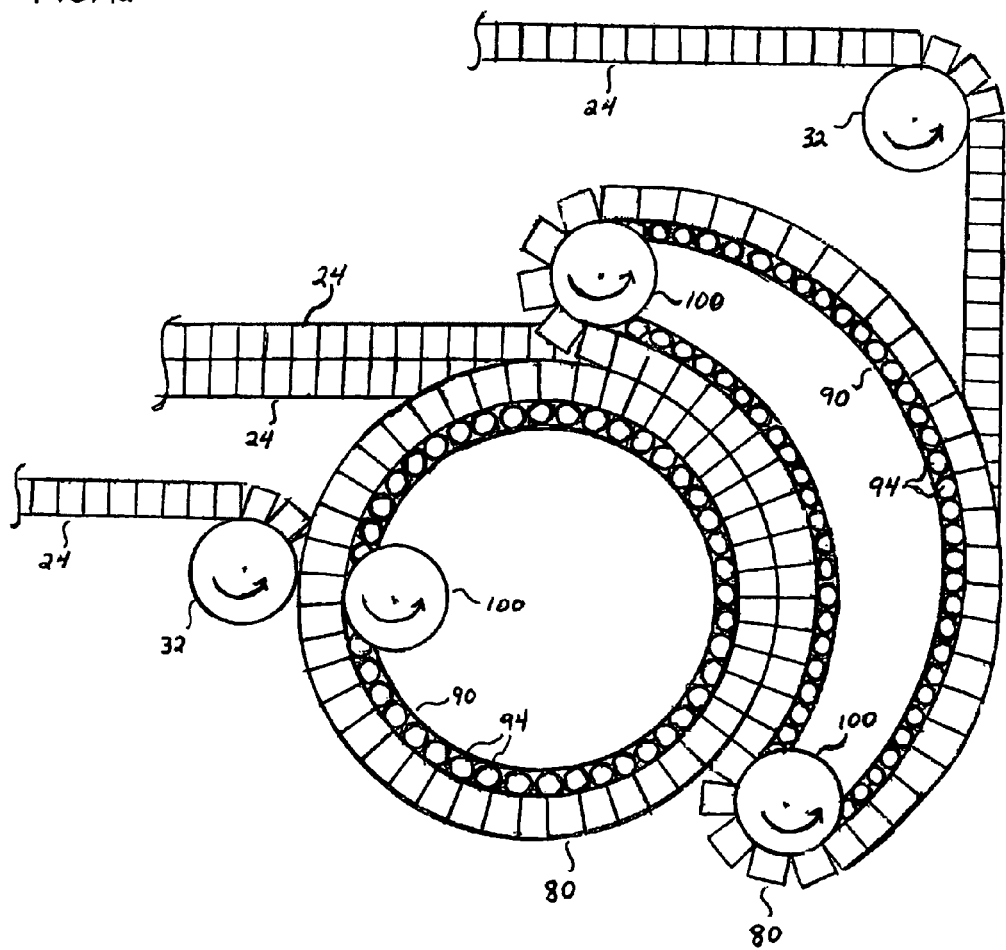
FIG. 12 is a side view illustration of a modified apparatus for producing articles with a curved profile.

The apparatus can be modified to produce shapes that are non-planar and non-linear, such as arcs and helical structures. FIG. 12 provides an illustration of one possible embodiment of the modified apparatus. In this case, a circular support frame 90 has been substituted for the flat support frame shown in FIG. 9. A matching arced frame is used to mount the second conveyer. The curved profile of the article to be produced matches the arc curvature of the guide path enclosed by the frames. The article length, however, is not limited to the length of the arc. For example, a helical spring of indefinite length could be produced. The curing section of the guide path is established on the segment of the frame that has the desired shape for the article. Moving die link drive wheels 32 are positioned so as to establish return paths for the upper and lower moving die link chains after they exit from the curing section. If the article is to be an arch, shearing links are inserted into the moving die link chains so that the article will be released from the apparatus after the motion of the moving die link chains moves the cured segment past the upper moving die link return drive wheel. If a helical shape is desired for the article, the alternative shearing operation will be used after an appropriate length of fiber has been drawn into the apparatus. The guide path curing section is set at the desired angle for the separation of the helical coils. A support rod is set at the exit end of the apparatus to hold the initial coils of the helix until the full length of the article has emerged from the apparatus.

EXAMPLE 5

Articles having Complex Non-Linear Shapes

The apparatus can be further modified to produce certain complex three dimensional articles. In this case, a support frame with curves and bends is substituted for the support frame 90 shown in FIG. 9. In addition, the supports for the upper and lower support frames would include a means for separating the mating channel guides, such as hydraulic actuators for raising the upper frame and lowering the lower frame. The moving die links draw in resin impregnated fiber that is cured in the same manner as in the above examples. After curing, the hydraulic actuators are turned on and the support frames are separated. After the mating frames have been separated so as to provide sufficient clearance for the article, the conveyers are cycled, ejecting the article. The system is then returned to the initial configuration for the next system cycle.

As described above, the apparatus is capable of producing pultruded articles at a higher rate than that of conventional pultrusion equipment. The basic reason for this is that the resin is cured in an extended guide path, rather than in a single static die. The production rate can be further increased by establishing parallel streams. In this case, more than one fiber uptake station is used and parallel, side-by-side guide paths are used to cure more than one article at a time.

The foregoing embodiments are illustrative of the present invention and are not to be construed as limiting thereof. This invention provides the unique capability to produce thermoset articles that vary in shape in both along the transverse and longitudinal axes. It also is uniquely capable of producing articles with shapes that include segments that regress, i.e. extend back in the direction of the input to the apparatus. Through the use of specially shaped moving die links, the invention is also capable of producing, in a single step manufacturing process, articles with openings, holes, and dents. The invention is unique in that it provides a method for cutting the reinforcing fibers before the curing process, eliminating the need for a heavy duty cut-off saw. In the production of articles with complex shapes, the invention improves throughput by rapidly moving the resin impregnated fiber into a guide path and then curing the entire length of the material in the guide path at once. The invention offers flexibility in the production of many different shapes of FRP articles, using a single apparatus that requires only straightforward modification when a change in shape is desired.

I claim:

1. An apparatus for preparing a fiber-reinforced thermoset article having a variety of shapes, including both linear and non-linear shapes, the apparatus comprising:
one or more sets of dies for enclosing a continuous material comprised of reinforcing fibers which are impregnated with a heat curable thermosetting resin composition;
wherein one or more of said sets of dies is comprised of three types of die links connected together to form mating continuous loops of moving die links comprised of:
a) shaping die links to grip, shape and draw fiber reinforced polymer (FRP) material into the apparatus;
b) shearing die links to shear uncured FRP material to a desired length, and
c) spacer die links to separate one manufactured article from another;
drive mechanisms coupled with said set or sets of dies for independently selectively moving said set or sets of dies at selectable rates of speed;
an energy source for heating at least a portion of said set or sets of dies to a temperature sufficiently high to cause said heat curable thermosetting resin to cure; and
a control mechanism configured to determine the timing of the activation of the different components of the apparatus.

2. The apparatus of claim 1, wherein said set of dies for enclosing said continuous material is comprised of two or more closed loops of mating linked die segments with non-adherent surfaces.

3. The apparatus of claim 2, wherein said mating linked die segments include dies configured for selectively gripping and moving or holding in place, shaping, piercing, dividing, rejoining, and/or shearing said continuous material.

4. The apparatus of claim 1, wherein said drive mechanisms coupled with said sets of dies is comprised of one or more electric motors connected through one or more transmissions to one or more drive wheels.

5. The apparatus of claim 1, wherein said set of dies for enclosing said continuous material is comprised of two or more closed loops of mating linked die segments having the capabilities to form the cross-sectional shape of the article, move the resin impregnated fiber composition through the apparatus, sever or pierce the resin impregnated fiber composition, and hold severed resin impregnated fiber composition in place; and a second set of dies comprised of linked die segments configured to form a predetermined path to enclose and heat said set of dies enclosing said continuous material so as to cure the thermosetting resin.

6. The apparatus of claim 5, wherein the energy source for heating at least a portion of said predetermined path is provided by electric heaters attached to said predetermined path.

7. The apparatus of claim 1, wherein said control mechanism is comprised of a computer connected to sensors and actuators.

8. An apparatus for preparing a fiber-reinforced thermoset article having a variety of shapes, including both linear and non-linear shapes, the apparatus comprising:
one or more sets of dies for enclosing a continuous material comprised of reinforcing fibers which are impregnated with a heat curable thermosetting resin composition;
wherein one or more of said sets of dies is comprised of three types of die links connected together to form mating continuous loops of moving die links comprised of:
b) shaping die links to grip, shape and draw fiber reinforced polymer (FRP) material into the apparatus;
b) shearing die links to shear uncured FRP material to a desired length, and
c) spacer die links to separate one manufactured article from another;
wherein one of said sets of dies is configured to define the longitudinal shape of said continuous material;
drive mechanisms coupled with said set or sets of dies for independently selectively moving said set or sets of dies at selectable rates of speed;
an energy source for heating at least a portion of said set or sets of dies to a temperature sufficiently high to cause said heat curable thermosetting resin to cure; and
a control mechanism for determining the timing of the activation of the different components of the apparatus.

9. The apparatus of claim 8, wherein said set of dies configured to define the longitudinal shape of the material is comprised of a series of mating guides mounted so as to define a predetermined path in the longitudinal shape of the article on structures that form an enclosure that can be selectively moved.

10. The apparatus of claim 8, wherein said predetermined path is comprised of a sequence of mating die segments that form mating guides that define an enclosure through which the linked die segments can be moved.

11. The apparatus of claim 9, wherein said structures are comprised of matching conveyers that cycle to move said mating guides.

12. The apparatus of claim 9, wherein said structures are mounted on a frame that is adjustable so as to allow the mating guides to be joined or separated.

13. The apparatus of claim 8, wherein the drive mechanism for cycling said conveyers is comprised of one or more electric motors connected through one or more transmissions to one or more drive wheels.

14. The apparatus of claim 8, wherein one or more of the mating guides is connected to an energy source so as to selectively heat some portion of the predetermined path to the curing temperature of the resin.

15. The apparatus of claim 8, wherein the energy source for heating at least a portion of said predetermined path is provided by electric heaters attached to said predetermined path.

16. The apparatus of claim 8, wherein said control mechanism is comprised of a computer connected to sensors and actuators.

17. An apparatus for preparing a fiber-reinforced thermoset article having a variety of shapes, including both linear and non-linear shapes, the apparatus comprising:
one or more sets of dies for enclosing a continuous material comprised of reinforcing fibers which are impregnated with a heat curable thermosetting resin composition;
wherein one or more of said sets of dies is comprised of three types of die links connected together to form mating continuous loops of moving die links comprised of:
a) shaping die links to grip, shape and draw fiber reinforced polymer (FRP) material into the apparatus;
b) shearing die links to shear uncured FRP material to a desired length, and
c) spacer die links to separate one manufactured article from another;
wherein said sets of dies are mounted on mating frames that may be separated to release said article after said thermosetting resin has been cured;
drive mechanisms coupled with said set or sets of dies for independently selectively moving said set or sets of dies at selectable rates of speed;
an energy source for heating at least a portion of said set or sets of dies to a temperature sufficiently high to cause said heat curable thermosetting resin to cure; and a control mechanism for determining the timing of the activation of the different components of the apparatus.

18. The apparatus of claim 17, wherein said mating frames are mounted on supports that are separable to the extent required to allow a cured thermoset article to be expelled from the apparatus.

19. The apparatus of claim 17, wherein said supports are separated and rejoined by the activation of hydraulic actuators.

* * * * *